US008316153B2

(12) United States Patent
Feng et al.

(10) Patent No.: US 8,316,153 B2
(45) Date of Patent: Nov. 20, 2012

(54) METHOD, NODE, AND SYSTEM FOR NOTIFYING PROXY UPDATE IN WMN

(75) Inventors: Danfeng Feng, Shenzhen (CN); Xuming Fang, Chengdu (CN); Shujie Sun, Shenzhen (CN); Yonggang Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 12/882,033

(22) Filed: Sep. 14, 2010

(65) Prior Publication Data
US 2011/0016227 A1 Jan. 20, 2011

Related U.S. Application Data

(63) Continuation of application No. PCT/CN2009/070710, filed on Mar. 10, 2009.

(30) Foreign Application Priority Data

Mar. 14, 2008 (CN) .......................... 2008 1 0065571

(51) Int. Cl.
*G06F 15/16* (2006.01)
(52) U.S. Cl. ......................... 709/245; 709/225; 709/202
(58) Field of Classification Search .................. 709/245, 709/225, 202
See application file for complete search history.

(56) References Cited

U.S. PATENT DOCUMENTS

| 2006/0282667 A1* | 12/2006 | Kim et al. ..................... 713/169 |
| 2007/0165592 A1* | 7/2007 | Gossain et al. ............... 370/349 |
| 2007/0297371 A1* | 12/2007 | Lea ................................ 370/334 |
| 2008/0205385 A1* | 8/2008 | Zeng et al. .................... 370/389 |
| 2009/0180396 A1* | 7/2009 | Kish ............................. 370/254 |

FOREIGN PATENT DOCUMENTS

CN 1770780 A 5/2006
(Continued)

OTHER PUBLICATIONS

Zhou et al. "A Dynamic Hierarchical Mobility Management Protocol for Next Generation Wireless Metropolitan Area Networks." Consumer Communications and Networking Conference, Jan. 2007, IEEE. pp. 390-394.*

(Continued)

*Primary Examiner* — Larry Donaghue
*Assistant Examiner* — Nicholas Taylor
(74) *Attorney, Agent, or Firm* — Brinks Hofer Gilson & Lione

(57) ABSTRACT

Embodiments of the present invention disclose a method and node for notifying proxy update in a WMN and a WMN for notifying proxy update. By constructing the proxy update add message, where the proxy update add message includes the address of terminal, the current proxy node address after terminal switching and the destination node address of the terminal, and taking the address of the original proxy node before terminal switching as the address of the destination node, and sending the proxy update add message constructed to the original proxy node, where the proxy update add message is used for updating proxy information of the terminal in the proxy information table of the original proxy node to be the current proxy node address. It makes sure that packets received by the original proxy node which should be sent to the terminal could be received by the terminal, and packet loss rate during terminal switching could be reduced.

10 Claims, 7 Drawing Sheets

FOREIGN PATENT DOCUMENTS

| CN | 101076195 A | 11/2007 |
|---|---|---|
| WO | WO 2005/006676 A1 | 1/2005 |
| WO | WO 2006/121306 A1 | 11/2006 |
| WO | WO 2007/028297 A1 | 3/2007 |
| WO | WO 2007/084884 A2 | 7/2007 |
| WO | WO 2009/111975 A1 | 9/2009 |

OTHER PUBLICATIONS

Written Opinion of the International Searching Authority issued in corresponding PCT Patent Application No. PCT/CN2009/070710, mailed Jun. 4, 2009.

Extended European Search Report issued in corresponding European Patent Application No. 09719747.9, mailed Sep. 1, 2011.

Zhou et al., "A Dynamic Hierarchical Mobility Management Protocol for Next Generation Wireless Metropolitan Area Networks" IEEE 2007.

Amir et al., "Fast Handoff for Seamless Wireless Mesh Networks", Johns Hopkins University, Department of Computer Science, *Mobisys'06*, Jun. 19-22, 2006, Uppsala, Sweden.

Navda et al., "Design and Evaluation of iMesh: An Infrastructure-mode Wireless Mesh Network", Computer Science Department, State University of New York at Stony Brook.7 pages, 2005.

Wei et al., "Seamless Handoff Support in Wireless Mesh Networks", IEEE 2006. 8 pages.

\* cited by examiner

| ID | Length | Flags | Sequence Number | Proxy Address | Destination Address | Number of Proxied Address | Proxied MAC Address #1 | ... | Proxied MAC Address #N |

FIG. 3

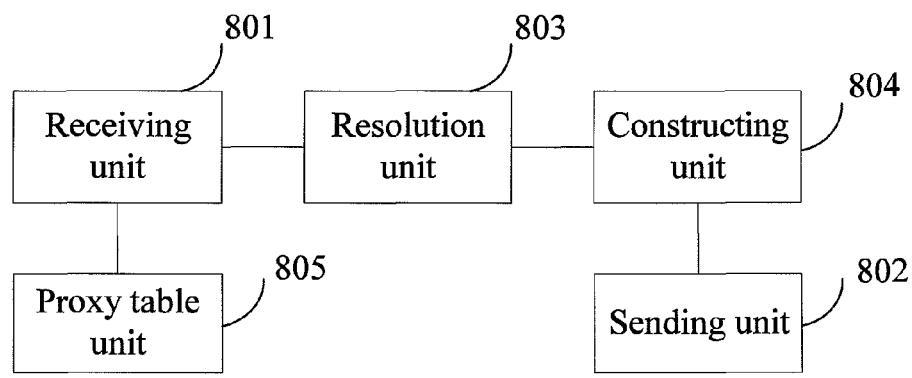
FIG. 7
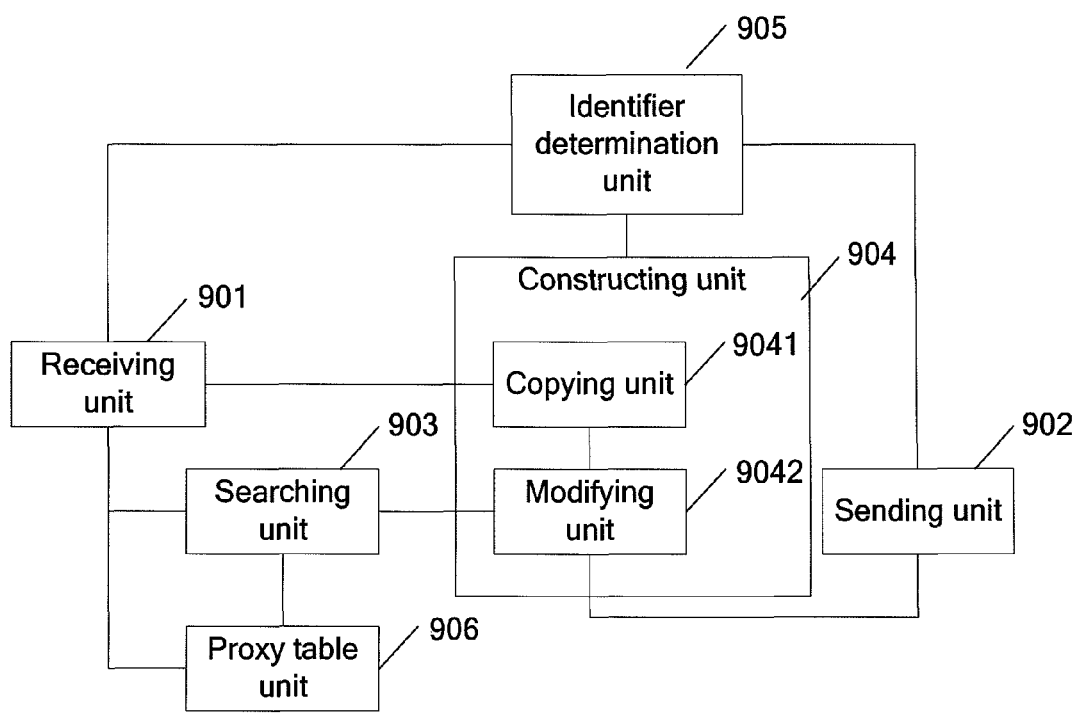
FIG. 8
FIG. 9

METHOD, NODE, AND SYSTEM FOR NOTIFYING PROXY UPDATE IN WMN

CROSS-REFERENCE TO RELATED APPLICATIONS

This application is a continuation of International Application No. PCT/CN2009/070710, filed on Mar. 10, 2009, which claims priority to Chinese Patent Application No. 200810065571.8, filed on Mar. 14, 2008, both of which are hereby incorporated by reference in their entireties.

FIELD OF THE INVENTION

The present invention relates to communications field, and more specifically, to a method, a Wireless Mesh Node, and a Wireless Mesh Network (WMN) system for notifying proxy update.

BACKGROUND OF THE INVENTION

The proxy update mechanism of the WMN in the prior art makes it possible that when a node in the WMN needs to send a packet to a terminal, it may send the packet to a proxy node of the terminal, namely the Mesh Access Point (MAP) associated with the terminal, and then the proxy node forwards the packet to the destination terminal. Before sending the packet, the Mesh node first searches its own proxy information table, acquires the address of the MAP associated with the terminal, and then sends, according to the routing table, the packet to the MAP associated with the terminal. Thus, the routing table saved in a node of the Mesh network only needs to take the Mesh node as the destination address rather than take the real destination terminal as the destination address, and thus the size of the routing table is reduced significantly. If the terminal Station (STA) switches among different MAPs, it becomes especially important to update proxy information in the Mesh nodes to make sure that the terminal could still receive packets timely and correctly.

According to the technical solution in the prior art, when the terminal STA switches among different MAPs, the process is as follows:

First, STA1 accesses the network through MAP1, STA2 accesses the network through MAP2, and STA1 and STA2 communicates with each other through the Mesh network.

When STA1 switches from MAP1 to MAP3, STA1 establishes association with MAP3. At this time, MAP1 is the original proxy node of terminal STA1, and MAP3 is the current proxy node of STA1.

Then, MAP3 sends a proxy update add message to a proxy information server in the Mesh network, for example, taking Mesh Point Portal (MPP) as the proxy information server, where the proxy update add message carries a Proxy Update Information Element (PU IE), the MAC address of terminal STA1, and the MAC address of STA1's current proxy node MAP3.

Through the proxy update add message, the MPP and nodes in the path from MAP3 to the MPP are instructed to create or update proxy information about STA1.

After receiving the proxy update add message, the MPP node replies a proxy update confirmation message to MAP3, where the proxy update confirmation message carries a Proxy Update Confirmation Information Element (PUC IE).

During research and implementation of the prior art, the inventor of the present invention finds the following problems in the prior art: After terminal STA1 switches, in the Mesh network, only nodes in the path from the current proxy node MAP3 of the terminal to the proxy information server MPP update the proxy information of the terminal timely, and other Mesh nodes that do not update the proxy information of the terminal timely would still send packets, which are intended to be sent to the terminal, to the original proxy node MAP1 of the terminal, resulting in packet loss.

SUMMARY OF THE INVENTION

The embodiments of the present invention provide a method for notifying proxy update in the WMN, a WMN node for notifying proxy update in the WMN, and two types of WMNs for notifying proxy update. In this way, associated nodes can update proxy information timely when terminal switches and packet loss rate during terminal switching is reduced.

The embodiments of the present invention provide a method for notifying proxy update in the WMN, including:

constructing a proxy update add message, where: the proxy update add message includes the address of the terminal and the address of the current proxy node after terminal switching, and the proxy update add message further includes the address of the destination node, where the address of the destination node is the address of the original proxy node before terminal switching; and sending the proxy update add message to the original proxy node, namely the proxy node before terminal switching, where the proxy update add message is used for updating the proxy information of the terminal in a proxy information table of the original proxy node to be the address of the current proxy node.

The embodiments of the present invention provide a WMN node for notifying proxy update in the WMN, including:

a constructing unit, configured to construct a proxy update add message, where the proxy update add message takes the address of the original proxy node of the terminal as the address of the destination node, and includes the address of the terminal and the address of the current proxy node of the terminal; and a sending unit, configured to send the proxy update add message to the destination node according to the address of the destination node in the constructing unit, where the proxy update add message is used for updating the proxy information of the terminal in a proxy information table of the destination node to be the address of the current proxy node of the terminal.

The embodiments of the present invention provide a WMN for notifying proxy update, including: a current proxy node before a first terminal switches, and an original proxy node after the first terminal switches.

The current proxy node includes:

a first receiving unit, configured to receive a request message sent by the first terminal or the original proxy node, where the request message carries the address of the original proxy node;

a first resolution unit, configured to acquire the address of the original proxy node of the first terminal from the request message received by the first receiving unit;

a first constructing unit, configured to construct a proxy update add message according to the address of the original proxy node acquired by the first resolution unit, where the proxy update add message constructed takes the address of the original proxy node as the address of the destination node, and includes the address of the current proxy node and the address of the first terminal; and a first sending unit, configured to send the proxy update add message to the destination node according to the address of the destination node in the first constructing unit, where the proxy update add message is used for updating proxy information of the first terminal in the proxy information table of the destination node to be the address of the current proxy node, namely the address of the proxy node after the first terminal switches.

The original proxy node includes:

a second receiving unit, configured to receive the proxy update add message sent by the current proxy node; and a second proxy table unit, configured to update, according to the address of the current proxy node of the first terminal carried by the proxy update add message which is received by the second receiving unit, the proxy information of the first terminal in local proxy information table to be the address of the current proxy node.

The embodiments of the present invention provide another type of WMN for notifying proxy update, including: a current proxy node of the first terminal, an intermediate node, and an original proxy node of the first terminal.

The current proxy node includes:

a first receiving unit, configured to receive an association request sent by the first terminal;

a first constructing unit, configured to, after association with the first terminal is established, construct a proxy update add message in the way that the address of the proxy information server is taken as the destination node address, where the proxy update add message takes the address of the proxy information server as the address of the destination node, and includes the address of the current proxy node and the address of the first terminal; and a first sending unit, configured to send the proxy update add message to the destination node according to the address of the destination node in the first constructing unit, where the proxy update add message is used for updating proxy information of the first terminal in the proxy information table of the destination node to be the address of the current proxy node, namely the address of the proxy node after the first terminal switches.

The intermediate node includes:

a third receiving unit, configured to receive the proxy update add message sent by the current proxy node, where the proxy update add message carries the address of the current proxy node of the first terminal and the address of the first terminal;

a third searching unit, configured to search, according to the address of the first terminal carried by the proxy update add message which is received by the third receiving unit, the local proxy information table to acquire the address of the original proxy node of the first terminal, namely the address of the proxy node before the first terminal switches;

a third constructing unit, configured to: construct a proxy update add message according to the address of the original proxy node acquired by the third searching unit, and instruct the third sending unit to send the proxy update add message constructed to the destination node, where the proxy update add message constructed takes the address of the original proxy node as the destination node address, and includes the address of the first terminal and the address of the current proxy node; and a third sending unit, configured to send the proxy update add message to the destination node according to the address of the destination node in the third constructing unit, where the proxy update add message is used for updating proxy information of the first terminal in the proxy information table of the destination node to be the address of the current proxy node, namely the address of the proxy node after the first terminal switches.

The original proxy node includes:

a second receiving unit, configured to receive the proxy update add message sent by the intermediate node; and a second proxy table unit, configured to update, according to the address of the current proxy node of the first terminal carried by the proxy update add message received by the second receiving unit, proxy information of the first terminal in the local proxy information table to be the address of the current proxy node.

It can be seen from the above technical solution that: By constructing a proxy update add message that includes the address of terminal, the address of the current proxy node, and the address of the destination node of the terminal, the address of the original proxy node before terminal switching is taken as the address of the destination node, and the proxy update add message constructed is sent to the original proxy node; the proxy update add message is used for updating proxy information of the terminal in the proxy information table of the original proxy node to be the address of the current proxy node. In this way, the original proxy node could be able to update its own proxy information table timely, and forward, according to the updated proxy information table, packets that take the terminal as destination terminal. Therefore, it can be ensured that packets received by the original proxy node and sent to the terminal could be received by the terminal. Therefore, with the method for notifying proxy update in the WMN, the WMN node, and the WMN system provided by the embodiments of the present invention, packet loss rate during terminal switching could be reduced.

BRIEF DESCRIPTION OF THE DRAWINGS

FIG. 3 is a diagram of PU IE format in a proxy update add message according to an embodiment of the present invention;

FIG. 7 is a diagram of a management frame format according to an embodiment of the present invention;

FIG. 8 is a structure diagram of a device for notifying proxy update in WMN according to an embodiment of the present invention; and FIG. 9 is a structure diagram of a device for notifying proxy update in WMN according to another embodiment of the present invention;

DETAILED DESCRIPTION OF THE EMBODIMENTS

To make the purpose, technical solution and advantage of the present invention clearer, a detailed description of the present invention is provided below with reference to accompanying figures and embodiments Embodiment 1

Figure 1:
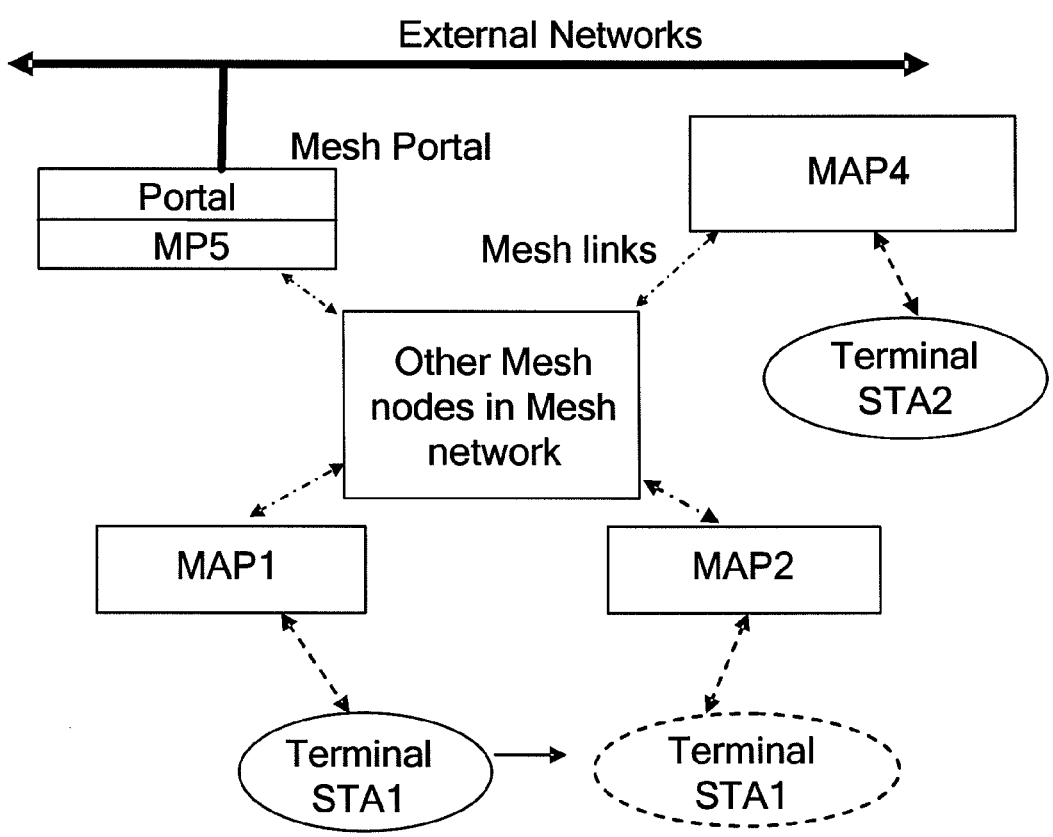
FIG. 1 is a diagram of a WMN for notifying proxy update according to an embodiment of the present invention.

As shown in FIG. 1, embodiment 1 of the present invention provides a WMN for notifying proxy update, including: the original proxy node MAP1 before terminal STA1 switches, and the current proxy node MAP2 after terminal STA1 switches, where MAP1 and MAP2 communicate with each other through the Mesh network, and the path between them has one hop or multi-hops.

The current proxy node MAP2 of STA1 includes: a receiving unit, a sending unit, a resolution unit and a constructing unit.

The receiving unit is configured to receive a request message sent by terminal STA1 or the original proxy node MAP1 of the terminal, where the request message carries the address of the original proxy node, i.e., the address of the proxy node before terminal STA1 switches, namely the address of MAP1.

The resolution unit is configured to acquire the address of the original proxy node of terminal STA1, namely the address of MAP1, from the request message received by the receiving unit.

The constructing unit is configured to construct a proxy update add message according to the address of the original proxy node MAP1 acquired by the resolution unit, and instruct the sending unit to send the proxy update add message constructed to a destination node, where the proxy update add message constructed takes the address of the original proxy node MAP1 as the destination node address and the address of node MAP2 itself as the address of the current proxy node of terminal STA1, and includes the address of terminal STA1.

The sending unit is configured to send the proxy update add message to the destination node MAP1 according to the destination node address, namely address of MAP1, where the proxy update add message is used for updating proxy information of terminal STA1 in the proxy information table of the destination node MAP1 to be the address of the current proxy node, i.e., the address of the proxy node after terminal STA1 switches, namely address of MAP2.

The original node MAP1 of STA1 includes: a second receiving unit and a second proxy table unit.

The second receiving unit is configured to receive the proxy update add message sent by the current proxy node MAP2 of terminal STA1, where the proxy update add message carries the address of the current proxy node MAP2 of terminal STA1 and the address of terminal STA1.

The second proxy table unit is configured to update proxy information of terminal STA1 to be the address of the current proxy node MAP2 in the local proxy information table of MAP1 itself according to the address of the current proxy node of terminal STA1, namely address of MAP2, carried in the proxy update add message received by the second receiving unit.

In other embodiments, MAP1 could further includes: a second buffer unit, configured to buffer packets sent by nodes or terminals to terminal STA1 as destination terminal; a second sending unit, configured to forward packets sent by nodes or terminals to terminal STA1 as destination terminal to terminal STA1 according to updated proxy information of STA1. After the receiving unit of MAP2 receives packets forwarded by MAP1 to terminal STA1 as destination terminal, the sending unit of MAP2 sends the packets to terminal STA1. For example, before and after STA1 switches, STA2 keeps sending packets to STA1 continuously; before switching, STA2 sends packets to MAP1 through MAP4, and then the packets are forwarded to STA1 by MAP1; after STA1 switches to MAP2, STA2 still sends packets to STA1 through MAP4. If MAP4 fails to update the local proxy information table timely, it still sends packets that should be sent to STA1 to MAP1. At this time, MAP1 does not act as a proxy of STA1, and MAP1 buffers packets that are to be sent to STA1 in its own second buffer unit. Then, after MAP1 receives the proxy update add message sent by the current proxy node MAP2 of STA1, according to the address of MAP2 thereof, MAP1 updates proxy information of terminal STA1 in the local proxy information table, and forwards packets that are sent to STA1 from STA2 to MAP2. Further, MAP2 sends the packets to STA1, and thus the packet loss rate is reduced.

In the present embodiment or other embodiments, the address of nodes or terminals could be the Media Access Control (MAC) address of nodes or terminals. During the process of sending the proxy update add message through the Mesh network, nodes receiving the message could update its own proxy information table according to the message, and update proxy information of terminal STA1 to be the address of the current proxy node MAP2.

In other embodiments, the WMN for notifying proxy update may further include a proxy information server, configured to save proxy information of the Mesh network. The proxy information server could be MPP, such as MP5 in FIG. 1, or other nodes in the configured network, not defined herein. When MAP2 sends the proxy update add message to MAP1, another proxy update add message could be constructed and the address of the proxy information server may be taken as the destination node address. Then, the proxy update add message is sent to the proxy information server. Therefore, after the proxy information server receives the message, MAP2 could update its own proxy information table according to the proxy update add message.

Embodiment 2

Figure 2:
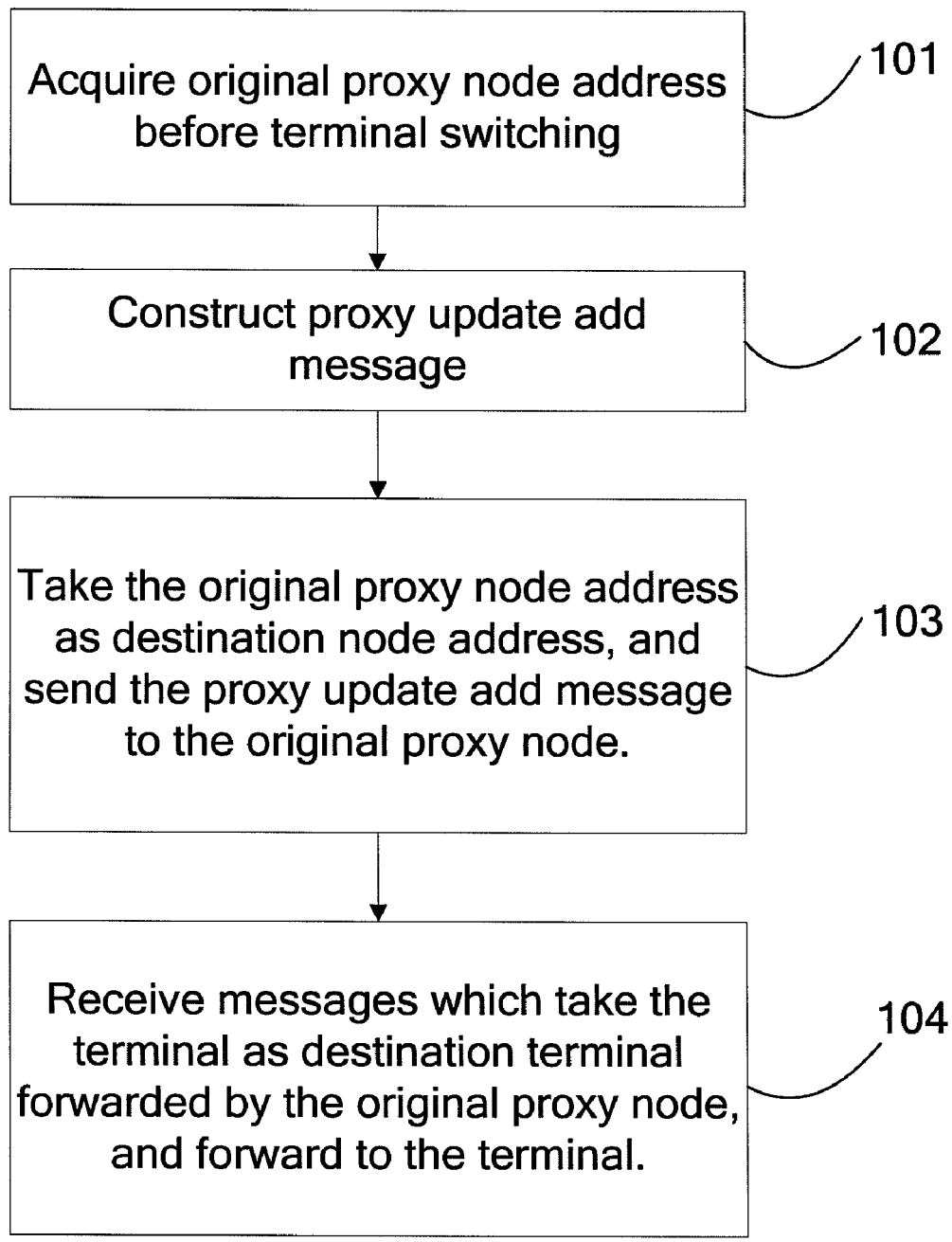
FIG. 2 is a flow chart of a method for notifying proxy update in the WMN according to an embodiment of the present invention.

As shown in FIG. 2, embodiment 2 of the present invention provides a method for notifying proxy update in a WMN. For clear description, MAP1 is taken as the original proxy node, namely the proxy node before STA1 switches; MAP2 is taken as the current proxy node, namely the proxy node after STA1 switches; and STA1 switches from MAP1 to MAP2. The method for notifying proxy update in the WMN includes the following steps:

Step 101: Acquire the address of the original proxy node, namely the address of the proxy node before the terminal switches.

In this step, the acquiring of the address of the original proxy node, namely the address of the proxy node before the terminal switches, could be that:

MAP2 receives a re-association request sent by terminal STA1, where the re-association request carries the original proxy node address of terminal STA1, namely address of MAP1, and acquires the address of the original proxy node MAP1 of terminal STA1 from the re-association request; or terminal STA1 initiates a rapid authentication request message during rapidly switching, at this time, MAP1 acts as the proxy of STA1 where the authentication request message is forwarded to the destination node MAP2 through the proxy node MAP1, and the message needs to carry its own MAC address when the MAP1 forwards the message; or MAP2 receives other messages that carry the address of MAP1 to acquire the address of MAP.

Step 102: Construct the proxy update add message, where the proxy update add message includes: the address of the terminal, the address of the current proxy node after the terminal switches, and the address of the destination node after the terminal switches.

In this step, in the proxy update add message constructed by MAP2, the acquired address of the original proxy node, i.e., the address of the proxy node before the terminal switches, namely address of MAP1, is taken as the destination node address, the address of MAP2 itself is taken as the address of the current proxy node, namely the address of the proxy node after the terminal switches, and the address of the terminal is also carried in the proxy update add message constructed. There are several ways for acquiring the address of the terminal, which will not be defined specifically herein, for example, acquiring the address of STA1 from the re-association request sent by terminal STA1; or acquiring the address of STA1 from the probe request sent by terminal STA1; or acquiring the address of STA1 by interacting with terminal STA1 in other ways.

Step 103: Take the original proxy node address as destination node address, send the proxy update add message to the original proxy node, where the proxy update add message is used for updating proxy information of the terminal in proxy information table of the original proxy node to be the current proxy node address.

In this step, MAP2 sends the proxy update add message constructed to MAP1, and instructs MAP1 to update proxy information of terminal STA1 to the address of MAP2 in its own proxy information table. Furthermore, MAP2 could construct another proxy update add message which takes the proxy information server address as destination node address, carry the address of terminal STA1 and the address of the current proxy node MAP2, namely the address of proxy node MAP2 after terminal STA1 switches, in the proxy update add message, send the proxy update add message to the proxy information server, and instruct the proxy information server to update proxy information of terminal STA1 in its own proxy information table to the address of the current proxy node MAP2 of the terminal. It is understandable that the address of the proxy information server could be known by MAP2 through configuration or other ways. In the present embodiment, the proxy information server is assumed as the Mesh network node MP5. When the proxy update add message is being constructed, the format of the proxy update add message defined in IEEE 802.11s Standard Draft can be adopted, where the Proxy Update IE is carried, a Destination Address (destination node address) field is added to the Proxy Update IE, and the destination node address of the proxy update add message can be filled in. The format of the Proxy Update IE carried in the proxy update add message constructed in the present embodiment is shown in FIG. 3. Table 1 shows the description of each field.

MAP1 and MP5 respectively through the Mesh network. In the proxy update add message sent to MAP1, the MAP1 as destination node address is carried in "Destination Address" field, address of the current proxy node MAP2 of STA1 is carried in "Proxy Address" field, and address of terminal STA1 is carried in "Proxied MAC Address #I (MAC address of terminal I) field. In a proxy update add message, several "Proxied MAC Address #I" fields can be set, and therefore if multiple terminals switch from MAP1 to MAP2, MAP2 can send a proxy update add message to MAP1 for each STA, or carry addresses of all terminals switching from MAP1 to MAP2 within a period of time in the proxy update add message and send them to MAP1.

Step 104: Receive packets which take the terminal as destination terminal forwarded by the original proxy node, and forward the packets to the terminal.

In the step, after the original proxy node MAP1 of STA1 receives the proxy update add message sent by MAP2 through the Mesh network, MAP1 acquires the address of the current proxy node MAP2 of STA1 from the proxy update add message, updates its own local proxy information table, and sends packets, which are buffered by MAP1 itself and take STA1 as destination terminal, to MAP2 through the Mesh network. For example, before and after terminal STA1 switches from MAP1 to MAP2, terminal STA2 always sends packets which take STA1 as destination terminal to STA1 through MAP4; after STA1 switches to MAP2, if MAP4 fails to update its own local proxy information table timely, it still sends packets to MAP1 which should be sent to STA1; at this time MAP1 does not act as proxy of STA1 any more, and MAP1 buffers packets sent to STA1 in its own buffer unit; when MAP1 receives the proxy update add message sent by the current proxy node MAP2 of STA1, it forwards packets to MAP2 which should be sent to STA1 from STA2 according to the address of MAP2 thereof; after MAP2 receives packets which are forwarded by MAP1 and take terminal STA1 as destination terminal, it further sends the packets to STA1, and therefore it is ensured that before and after STA1 switches, all the packets sent to STA1 could be forwarded to STA1 correctly, and packet loss rate could be reduced.

In other embodiments, in step 101, after MAP2 acquires the address of the original proxy node MAP1 of terminal STA1, MAP2 further updates proxy information of terminal

TABLE 1

Description of each field in PU IE

| Parameter | Description |
| --- | --- |
| ID | Proxy Update element ID, which distinguishes one Proxy Update element from other IEs |
| Length | Length of the IE, ranging from Flags field to the last field |
| Flags | 0: the add proxy information; 1: proxy delete proxy information; Bit17: reserved |
| Sequence Number | Serial number of PU IE, indicating "new" or "old" and maintained by each node respectively |
| Proxy Address | MAC address of proxy node of the terminal, namely MAC address of the source node of the PU message |
| Destination Address | MAC address of the destination node of the proxy update message |
| Number of Proxied Address (N) | The number of terminals |
| Proxied MAC Address #I | MAC address of terminal I |

After MAP2 constructs a proxy update add message with the address of MAP1 as destination node address and a proxy update add message with the address of MP5 as destination node address, it sends the proxy update add messages to STA1 to the address of the current proxy node MAP2 of STA1 in its own local proxy information table. There are two situations for updating proxy information of terminal STA1 in the local proxy information table:

The first situation: The local proxy information table of MAP2 does not have proxy information of terminal STA1. At this time, MAP2 updates proxy information of terminal STA1 in the local proxy information table in the way of adding the address of the current proxy node of terminal STA1 as the address of MAP2 in the local proxy information table.

The second situation: In the local proxy information table of MAP2, the proxy node address of terminal STA1 is not the address of the current proxy node MAP2 of STA1. For example, in the local proxy information table of MAP2, the original proxy node address of terminal STA1 is the address of MAP1. At this time, MAP2 updates proxy information of terminal STA1 in the local proxy information table in the way of modifying the proxy information of STA1 from the address of MAP1 to the address of MAP2 in its own local proxy information table.

In the present embodiment, nodes in the path from MAP2 to MAP1 and node MAP1 update their own local proxy information table after receiving the proxy update add message constructed by MAP2 mentioned above; nodes in the path from MAP2 to MP5 and node MP5 update their own local proxy information table after receiving the proxy update add message constructed by MAP2.

In the present embodiment, by carrying the address of the destination node in the proxy update add message, the current proxy node of the terminal is able to send the proxy update add message to the original proxy node of the terminal timely. Therefore, the original proxy node could acquire the address of the current proxy node of the terminal timely, and forward packets that take the terminal as destination terminal buffered in the original proxy node to the terminal through the address of the current proxy node.

In other embodiment, as shown in FIG. 1, in a WMN provided by the embodiments of the present invention, the following scenario occurs: Terminal STA1 first switches or accesses to MAP1 from other MAP; then, terminal STA1 switches from MAP1 to the current proxy node MAP2 rapidly. After STA1 associates with MAP1, MAP1 sends the proxy update add message to proxy information server, and after STA1 rapidly switches to MAP2 and associates with MAP2, MAP2 sends the proxy update add message to the proxy information server. Because of uneven distribution of the network air interface environment, the proxy update add message sent by MAP2 will reach the proxy information server prior to the proxy update add message sent by MAP1. Therefore, the proxy information server first updates proxy information of STA1 to the address of MAP2, and then updates proxy information of STA1 to the address of MAP1, so that the proxy information server saves error proxy information of terminal STA1, that is, the proxy information of STA1 finally saved in the proxy server is the address of MAP1. However, through the technical solution of the present embodiment, because MAP2 sends the proxy update add message to MAP1, the proxy information of the terminal saved in MAP1 is correct, namely address of MAP2. Thus, even if the gateway node or other nodes in the network send packets that should be sent to terminal STA1 to MAP1 incorrectly, MAP1 could still forward the packets to the current proxy node MAP2 of terminal STA1 correctly by querying proxy information of terminal STA1 in the local proxy information table.

Embodiment 3

Figure 4:
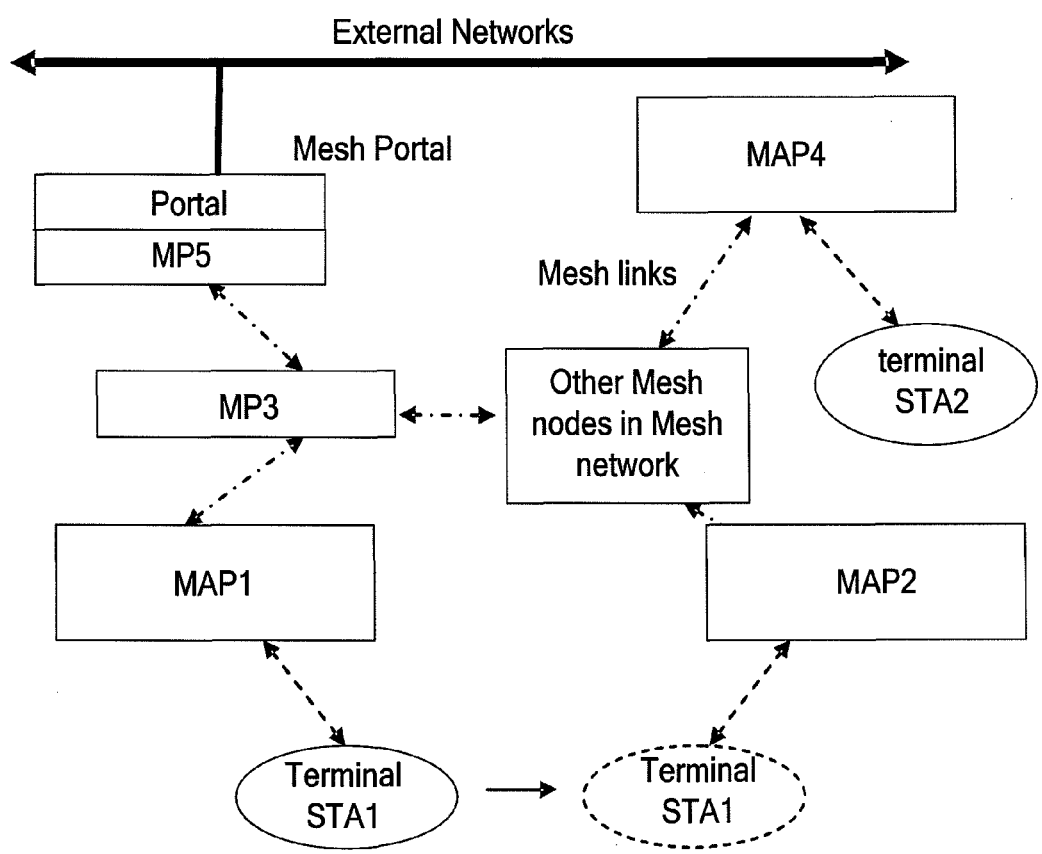
FIG. 4 is a diagram of a WMN for notifying proxy update according to another embodiment of the present invention.

As shown in FIG. 4, embodiment 3 of the present invention provides a WMN for notifying proxy update, including: original proxy node MAP1 before terminal STA1 switches, current proxy node MAP2 after terminal STA1 switches, and intermediate node MP3 in the path from MAP2 to proxy server MP5. The intermediate node could be any nodes except MAP1 and MAP2 in the Mesh network which have or can acquire the proxy information table, such as MP3 in FIG. 4. MP3 herein could be a MAP or common Mesh node which has or can acquire the proxy information table, where MP3, MAP1, MAP2 and MP5 communicate with each other through the Mesh network, and paths between nodes could have one hop or multi-hops.

The current proxy node MAP2 of STA1 includes: a receiving unit, a sending unit, and a constructing unit.

The receiving unit is configured to receive an association request sent by the receiving terminal STA1.

The constructing unit is configured to: after MAP2 establishes association with terminal STA1 according to the association request, construct the proxy update add message in the way that the address of the proxy information server MP5 is taken as the destination node address, and instruct the sending unit to send the proxy update add message constructed to the destination node, where the proxy update add message constructed takes the address of the proxy information server MP5 as destination node address and the address of node MAP2 itself as the current proxy node address of terminal STA1, and includes the address of terminal STA1.

The sending unit is configured to send the proxy update add message to the destination node MP5 through the Mesh network according to the destination node address, namely address of MP5, where the proxy update add message is used for updating proxy information of terminal STA1 in the proxy information table of the destination node MP5 to be the address of the current proxy node, i.e., the address of the proxy node after terminal STA1 switches, namely address of MAP2.

The original proxy node MAP1 of STA1 includes: a second receiving unit and a second proxy table unit.

The second receiving unit is configured to receive the proxy update add message sent by the intermediate node MP3, where the proxy update add message carries the address of the current proxy node MAP2 of terminal STA1 and the address of terminal STA1.

The second proxy table unit is configured to acquire the current proxy node address of terminal STA1, namely address of MAP2, from the proxy update add message received by the second receiving unit, and update proxy information of terminal STA1 in the local proxy information table of MAP1 itself to the address of the current proxy node MAP2.

In other embodiments, MAP1 may also include: a second buffer unit, configured to buffer packets sent by nodes or terminals to terminal STA1 as destination terminal; and a second sending unit, configured to forward packets sent by nodes or terminals to terminal STA1 as destination terminal to terminal STA1 according to updated proxy information of STA1. After the receiving unit of MAP2 receives packets forwarded by MAP1 to terminal STA1 as destination terminal, the sending unit of MAP2 sends the packets to terminal STA1.

The intermediate node MP3 includes: a third receiving unit, a third sending unit, a third searching unit, and a third constructing unit.

The third receiving unit is configured to receive the proxy update add message sent by the current proxy node MAP2, namely the proxy node after terminal STA1 switches, where the proxy update add message includes the address of terminal STA1 and the current proxy node address of terminal STA1, namely address of MAP2.

The third searching unit is configured to search the local proxy information table to acquire the address of the original proxy node MAP1 of terminal STA1 according to the address of terminal STA1 carried by the proxy update add message which is received by the third receiving unit.

The constructing unit is configured to construct the proxy update add message according to the address of the original proxy node MAP1 acquired by the third searching unit, and instruct the third sending unit to send the proxy update add message constructed to the destination node, where the proxy update add message constructed takes the address of the original proxy node MAP1 of terminal STA1 as destination node address, and includes the address of terminal STA1 and the address of the current proxy node MAP2 of terminal STA1.

The sending unit is configured to send the proxy update add message to the destination node MAP1 according to the destination node address, namely address of MAP1, where the proxy update add message is used for updating proxy information of terminal STA1 in the proxy information table of the destination node MAP1 to be the address of the current proxy node MAP2.

In other embodiments, the WMN for notifying proxy update further includes a proxy information server, configured to save proxy information of the Mesh network, and the proxy information server could be an MMP, such as MP5 in FIG. 4 or other nodes in the configured network that are not defined herein. When MP3 sends the proxy update add message to MAP1, the received proxy update add message sent by MAP2 could still be sent to the proxy information server MP5 so that it could update its own proxy information table according to the proxy update add message after the proxy information server receives the message.

Embodiment 4

Figure 5:
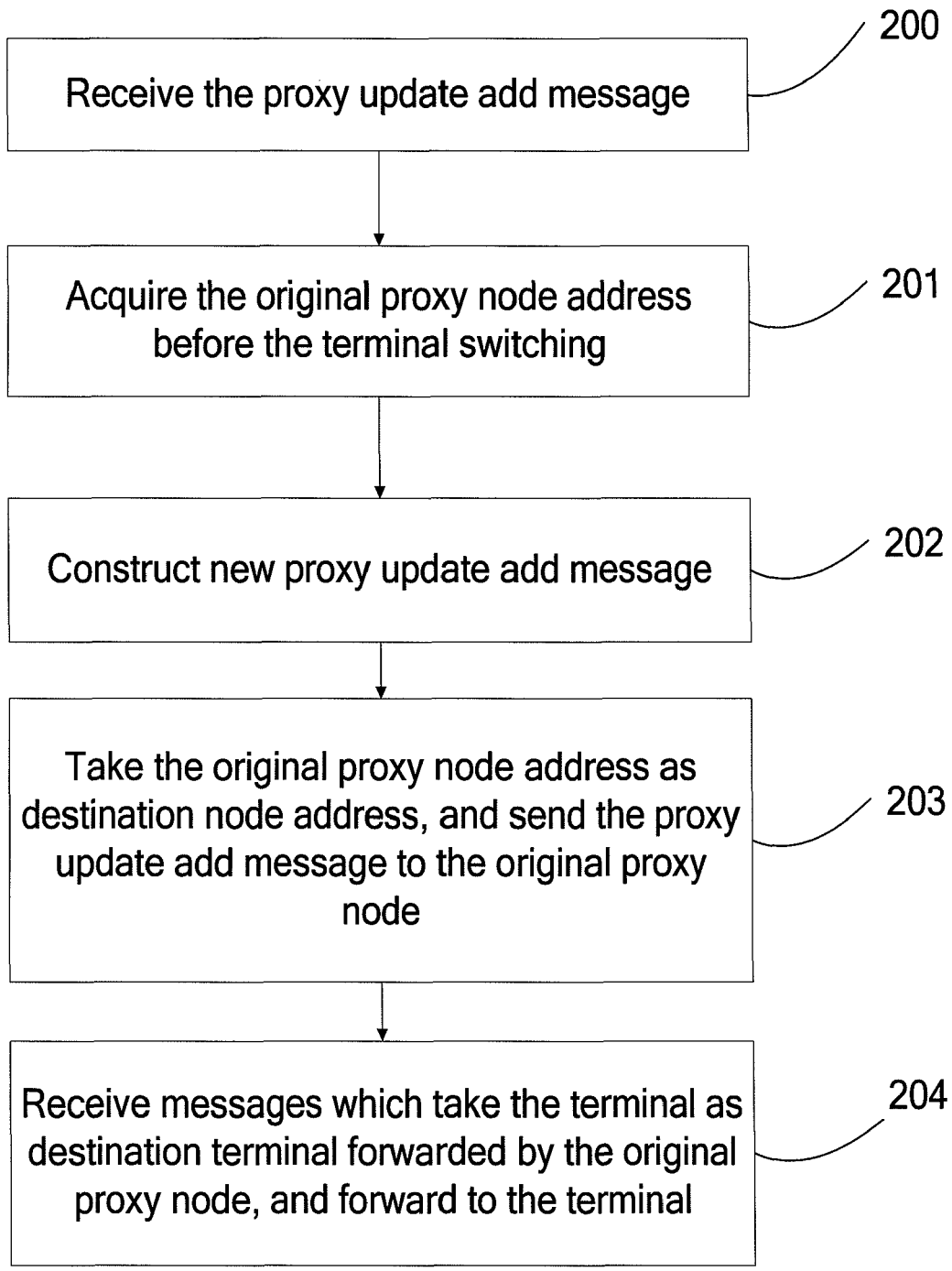
FIG. 5 is a flow chart of a method for notifying proxy update in WMN according to another embodiment of the present invention.

As shown in FIG. 5, embodiment 4 of the present invention provides a method for notifying proxy update in a WMN. For clear description, MAP1 is taken as the original proxy node, namely the proxy node before STA1 switches; MAP2 is taken as the current proxy node, namely the proxy node after STA1 switches; and the Mesh node MP3 is taken as a node in the path from MAP2 to proxy information server MP5 in network. The method for notifying proxy update in the WMN includes:

Step 200: Receive the proxy update add message. The proxy update add message includes: destination node address, current proxy node address of the terminal, and terminal address.

In this step, MP3 receives the proxy update add message which is sent by the current proxy node MAP2 of terminal STA1 through the Mesh network.

Step 201: Acquire the address of the original proxy node, namely the address of the proxy node before the terminal switches.

In this step, the acquiring of the address of the original proxy node, namely the address of the proxy node before the terminal switches is: After MP3 receives the proxy update add message sent by the current proxy node MAP2 of terminal STA1, according to the address of terminal STA1 carried in the proxy update add message, MP3 searches its own local proxy information table, acquires the address of the original proxy node MAP1 of terminal STA1. The format of the proxy update add message defined in IEEE 802.11s Standard Draft can be adopted, where a Proxy Update IE is carried, a Destination Address (destination node address) field is added to the Proxy Update IE, and the destination node address of the proxy update add message is filled in. The format of the Proxy Update IE carried in the proxy update add message sent by MAP2 is shown in FIG. 3, and description of each field is shown in Table 1. MAP2 takes the address of the proxy information server MP5 as destination node address in the proxy update add message sent by MAP2 and sends the proxy update add message to MP5 through the Mesh network, and MP3 is in the path from MAP2 to MP5. Therefore, MAP2 could receive the proxy update add message.

Step 202: Construct a new proxy update add message, where the proxy update add message includes: address of the terminal, current proxy node address after the terminal switches, and destination node address.

In this step, the constructing of the new proxy update add message by MP3 could be: copying the received proxy update add message sent by MAP2, and modifying the destination node address of the proxy update add message copied to the address of the original proxy node MAP1. The proxy update add message constructed by MP3 takes the address of original proxy node MAP1 as the destination node address, and includes the address of terminal STA1 carried in the proxy update add message sent by the current proxy node MAP3 and the address of the current proxy node MAP2, namely the address of proxy node MAP2 after terminal STA1 switches.

Step 203: Take the original proxy node address as destination node address, send the proxy update add message to the original proxy node, where the proxy update add message is used for updating proxy information of the terminal in proxy information table of the original proxy node to be the current proxy node address.

The proxy update add message is sent to the proxy information server by using the proxy information server address as destination node address.

In this step, MP3 takes the address of the original proxy node MAP1 of STA1 as destination node address, sends the proxy update add message constructed to MAP1, instructs MAP1 to update proxy information of terminal STA1 to the address of MAP2 in proxy information table of MAP1 itself according to the proxy update add message. Furthermore, MP3 could forward the received proxy update add message sent by MAP2 to proxy information server MP5. For example, if the original proxy update add message sent by MAP2 takes the address of MP5 as destination node address, the original proxy update add message sent by MAP2 could be forwarded to MP5 through the Mesh network directly. It is understandable that the address of the proxy information server could be known by MP3 through configuration or other ways. When the proxy update add message is being constructed, the format of the proxy update add message defined in IEEE 802.11s Standard Draft can be adopted, where the Proxy Update IE is carried, a Destination Address (destination node address) field is added to the Proxy Update IE, and the destination node address of the proxy update add message is filled in. The format of the Proxy Update IE carried by the proxy update add message constructed in the present embodiment is shown in FIG. 3, and description of each field is shown in Table 1.

After constructing the proxy update add message with the address of MAP1 as destination node address, MP3 sends the proxy update add message to MAP1 and MP5 through the Mesh network. In the proxy update add message sent to MAP1, the destination node address as MAP1 is carried in "Destination Address" field, address of the current proxy node MAP2 of STA1 is carried in "Proxy Address" field, and address of terminal STA1 is carried in "Proxied MAC Address #I" field.

Step 204: Receive packets that take the terminal as destination terminal and are forwarded by the original proxy node, and forward the packets to the terminal.

In the step, after the original proxy node MAP1 of STA1 receives the proxy update add message sent by MP3 through the Mesh network, MAP1 acquires the address of the current proxy node MAP2 of STA1 from the proxy update add message, updates its own local proxy information table, and sends packets, which are buffered by MAP1 itself and take STA1 as destination terminal, to MAP2 through the Mesh network. For example, before and after terminal STA1 switches from MAP1 to MAP2, terminal STA2 always sends packets that take STA1 as destination terminal to STA1 through MAP4; after STA1 switches to MAP2, if MAP4 fails to update its own local proxy information table timely, it still sends packets to MAP1 that should be sent to STA1; at this time, MAP1 does not act as the proxy of STA1 any more, and MAP1 buffers packets sent to STA1 in its own buffer unit; when MAP1 receives the proxy update add message sent by node MP3, it forwards packets to MAP2 that should be sent to STA1 from STA2 according to the address of MAP2 thereof; after MAP2 receives packets forwarded by MAP1 that take terminal STA1 as destination terminal, it further sends the packets to STA1. Therefore, it is ensured that before and after STA1 switches, all the packets sent to STA1 could be forwarded to STA1 correctly, and packet loss rate could be reduced.

In other embodiments, in step 201, after MP3 acquires the address of the original proxy node MAP1 of terminal STA1, MP3 further updates proxy information of terminal STA1 to the address of the current proxy node MAP2 of STA1 in its own local proxy information table. For example, in its own local proxy information table, MP3 modifies proxy information of STA1 from the address of MAP1 to the address of MAP2. Thereof, there are two situations for updating proxy information of terminal STA1 in the local proxy information table: The local proxy information table of MP3 does not have proxy information of STA1; or, in the local proxy information table of MP3, the proxy information of STA1 is the address of the original proxy node MAP1. Detailed update process for both situations can refer to description of Embodiment 2, which is not repeated herein.

Figure 6:
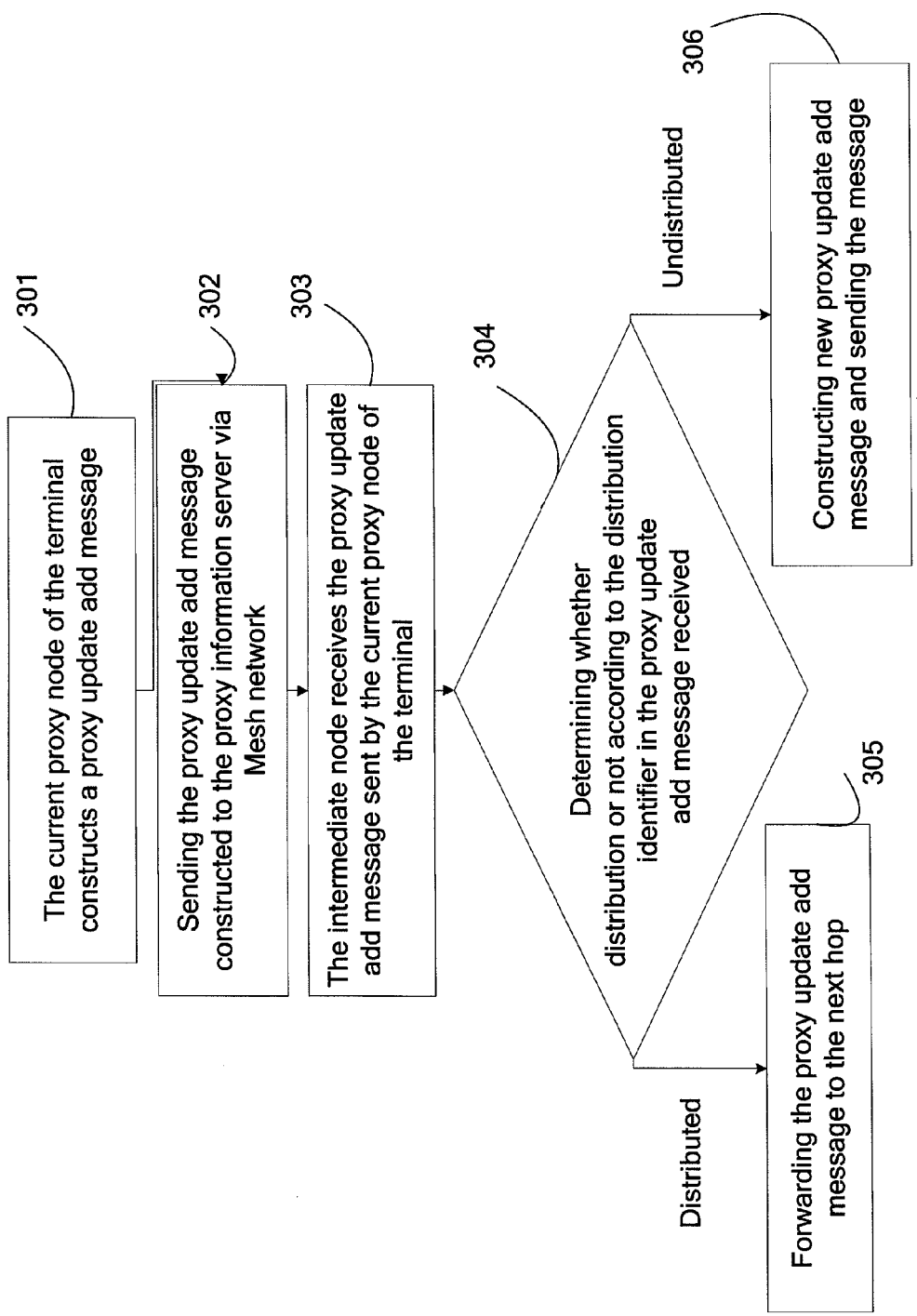
FIG. 6 is a flow chart of using distribution identifier of a method for notifying proxy update in the WMN according to another embodiment of the present invention.

In other embodiments, the proxy update add message may further include distribution identifier. The distribution identifier is used for identifying whether the proxy update add message is sent to the original proxy node or not. For example, reserved bits in Flags field are used as the distribution identifier. Take Bit 1 as example. When Bit 1 is 1, it means that the proxy update add message has been forwarded to the original proxy node of the terminal; when Bit 1 is 0, it means that the proxy update add message has not been forwarded to the original proxy node of the terminal. If address information of multiple terminals is carried by a proxy update add message, different distribution identifiers can be set separately for different terminal addresses, for example, using seven bits (Bit 2-Bit 7) reserved in Flags fields to represent distribution situations of seven different terminal addresses. Further, an STA flags (terminal identifier) field could be added, the length of which is multiple of 8 bits. Therefore, the largest number of address information of the terminal carried in the proxy update add message is equal to the length of STA flags. In addition, flags field can be added for each terminal address to identify whether a node has forwarded the proxy update add message of the terminal to the original proxy node or not. The current proxy node could set the distribution identifier bits corresponding to terminal addresses that need not be distributed to the status that the proxy update add message has been sent to the original proxy node. Then, the intermediate node will not distribute for address information of the terminals, where distribution herein means that the proxy update add message is sent to the original proxy node of the terminal and the proxy information server according to the proxy update add message sent by the current proxy node of the terminal. FIG. 6 shows the steps of using the distribution identifier:

Step 301: The current proxy node MAP2 of STA1 constructs a proxy update add message. In the proxy update add message, the address of STA1 is carried in "Proxied MAC Address #I (MAC address of the terminal I) field, and the address of proxy information server MP5 is taken as destination node address in "Destination Address" field, and "Proxy Address" field carries the address of the current proxy node MAP2 of STA1. MAP2 sets the distribution identifier bit corresponding to STA1 in the proxy update add message constructed to the status of not sending the proxy update add message to the original proxy node, that is, the proxy update add message is not sent to the original proxy node MAP1 of STA1. Of course, in the proxy update add message constructed, multiple terminal addresses could be carried in the way mentioned above. If it is unnecessary to distribute for some terminal addresses thereof, MAP2 sets the distribution identifier bits corresponding to these terminals to the status of having sent the proxy update add message to original proxy node.

Step 302: MAP2 sends the proxy update add message constructed to MP5 through the Mesh network.

Step 303: The intermediate node MP3 receives the proxy update add message sent by the current proxy node MAP2 of STA1.

Step 304: MP3 determines whether to perform distribution or not according to the distribution identifier in the proxy update add message received. For example, MP3 determines whether to send the proxy update add message to the current proxy node MAP1 or not according to the distribution identifier bit corresponding to STA1 in the proxy update add message; if the proxy update add message has been sent to original proxy node MAP1, the process proceeds to step 305; otherwise, the process proceeds to step 306.

Step 305: Forward the proxy update add message to the next hop. When the proxy update add message has been sent to the original proxy node MAP1, the proxy update add message is forwarded to next hop, and proxy information of terminal STA1 in the local proxy information of MP3 itself is updated according to the proxy update add message.

Step 306: Construct a new proxy update add message, modify the distribution identifier to the status of having sent the proxy update add message to the original proxy node, and send the proxy update add message constructed to the original proxy node and the proxy information server. For example, if the proxy update add message is not sent to original proxy node MAP1, the process proceeds to step 202, and in the step 202, the distribution identifier corresponding to STA1 is modified to the status of having sent the proxy update add message to the original proxy node; then, the proxy update add message carrying the distribution identifier of having sent the proxy update add message to MAP1 is sent to MAP1 and MP5 based on that the addresses of original proxy node MAP1 and proxy information server MP5 serve as the destination node address.

In other embodiments, if all intermediate nodes in the path from MAP2 to MP5 could not distribute the proxy update add message to MAP1, the proxy update add message could be distributed to MAP1 by MP5. For example, after MP5 receives the proxy update add message sent by MAP2 through the Mesh network, it copies the proxy update add message, and modifies the destination node address of the copied proxy update add message to the address of MAP1, and forwards the proxy update add message that takes MAP1 as destination node address to MAP1 through the Mesh network; or after receiving the proxy update add message sent by MAP2 through the Mesh network, MP5 updates its own local proxy information table, modifies the destination node address of the message to the address of MAP1 directly, and forwards the proxy update add message that takes MAP1 as destination node address to MAP1 through the Mesh network. If the proxy update add message contains a distribution identifier, MP5 could make judgment according to the distribution identifier that it only needs to update its own local proxy information table when the proxy update add message has been sent to MAP1 and it updates its own local proxy information table and sends the proxy update add message to MAP1 based on that MAP1 serves as the destination node address when the proxy update add message has not been sent to MAP1. Reasons for not being able to forward messages to MAP1 may be: Routing tables of nodes in the path have no path to MAP1; or, routing tables of nodes in the path do not have proxy information of the terminal, and MP5 could communicate with MAP1 as the proxy information server, and therefore could ensure success of distribution.

In the present embodiment, nodes in the path from MAP2 to MP3 and node MP3 update their own local proxy information table after receiving the proxy update add message mentioned above constructed by MAP2; nodes in the path from MP3 to MP5, node MP5, nodes in the path from MP3 to MAP1, and node MAP1 update their own local proxy information table after receiving the proxy update add message constructed by MAP2.

In the present embodiment, by carrying the address of the destination node in the proxy update add message, the current proxy node of the terminal is able to send the proxy update add message to the original proxy node of the terminal timely. Therefore, the original proxy node could acquire the address of the current proxy node of the terminal timely, and forward packets which take the terminal as destination terminal buffered in the original proxy node to the terminal through the address of the current proxy node.

Embodiment 5

Embodiment 5 provides another method for carrying destination node address in the proxy update add message, as shown in FIG. 7. Address 3 (Addr3) field in the management frame of IEEE 802.11 standard is reused for carrying the destination node address. Addr 3 field in the management frame MAC head is re-adopted, assigned with a new meaning, and used to represent MAC address of the destination node of the proxy update add message. Addr 3 field of MAC head is Basic Service Set Identification (BSSID) field.

In the above embodiment, the node address field in the proxy update add message could be deleted, and the method of Addr 3 field in the reused MAC head provided by the present embodiment could be used for carrying the destination node address.

After proxy update using above embodiments, during data packet forwarding, Addr 3 field of the data packet is used for carrying the destination node MAC address. After the forwarding node acquires the data packet, its own local proxy information table is searched firstly according to address 5 (destination terminal MAC address) of the data packet. If the local proxy information table of forwarding node itself has proxy information of the destination terminal, the MAC address of the current proxy node of the destination terminal is acquired and the data packet is forwarded to the current proxy node of the destination terminal directly according to the address of the current proxy node. If the local proxy information table of the forwarding node itself has no proxy information of the destination terminal, forwarding is performed according to address 3 (Mesh destination node address) of the data packet. As the method of notifying proxy update in above embodiments is adopted, the forwarding node could update its own local proxy information table timely. Further, in the process of data forwarding mentioned above, data packets are sent to the correct proxy node of the destination terminal by searching the local proxy information table to acquire the correct current proxy node of the destination terminal. Therefore, data forwarding burden of other nodes in the network could be reduced, and time delay and packet loss rate could be reduced during terminal switching.

Embodiment 6

As shown in FIG. 8, embodiment 6 provides a device for notifying proxy update in WMN, the device includes:

a receiving unit 801, configured to receive a request message sent by the receiving terminal or the original proxy node, namely the proxy node before terminal switching, where the request message carries the address of the original proxy node, namely the address of the proxy node before terminal switching;

a sending unit 802, configured to send the proxy update add message to the destination node according to the destination node address, where the proxy update add message is used for updating proxy information of the terminal in the proxy information table of the destination node to be the address of the current proxy node, namely the address of the proxy node after the terminal switches;

a resolution unit 803, configured to acquire the address of the original proxy node of the terminal from the request message received by the receiving unit 801; and a constructing unit 804, configured to: construct the proxy update add message according to the address of the original proxy node acquired by the resolution unit 803, and instruct the sending unit 802 to send the proxy update add message constructed to destination node, where the proxy update add message constructed takes the address of the original proxy node as destination node address, and includes the address of the current proxy node and the address of the terminal.

In other embodiments, the device for notifying proxy update also includes proxy table unit 805, configured to: save the local proxy information table, and update the local proxy information table according to the request message received by the receiving unit 801.

Further, the device for notifying proxy update in the present embodiment could be set in the MAP, which can be current proxy node MAP2 of terminal STA1 in the WMN provided in embodiment 1.

Embodiment 7

As shown in FIG. 9, embodiment 7 provides another device for notifying proxy update in the WMN, the device includes:

a receiving unit 901, configured to receive the proxy update add message sent by the current proxy node, namely the proxy node after terminal switching, where the proxy update add message carries the address of the current proxy node of the terminal and the address of the terminal;

a sending unit 902, configured to send the proxy update add message to the destination node according to the destination node address, where the proxy update add message is used for updating proxy information of the terminal in the proxy information table of the destination node to be the address of the current proxy node;

a searching unit 903, configured to search, according to the address of the terminal carried in the proxy update add message received by the receiving unit 901, the local proxy information table to acquire the address of the original proxy node, namely the address of the proxy node before the terminal switches; and a constructing unit 904, configured to construct the proxy update add message according to the address of the original proxy node of the terminal acquired by the searching unit 903, and instruct the sending unit 902 to send the proxy update add message constructed to the destination node, where the proxy update add message constructed takes the address of the original proxy node as destination node address, and includes the address of the terminal and the address of the current proxy node.

In other embodiments, the device for notifying proxy update also includes: identifier determination unit 905, configured to make judgment according to the distribution identifier carried in the proxy update add message received by the receiving unit 901, where the distribution identifier is used for identifying whether the proxy update add message is sent to the original proxy node or not; when the proxy update add message has been sent to the original proxy node, the identifier determination unit instructs the sending unit 902 to forward the proxy update add message to next hop; when the proxy update add message has not been sent to the original proxy node, the identifier determination unit instructs the searching unit 903 to search the local proxy information table and acquire the address of the original proxy node, namely the address of the proxy node before terminal switching, and/or instructs the constructing unit 904 to construct a proxy update add message according to original proxy node address of terminal acquired by the searching unit 903, and sets the distribution identifier in the proxy update add message constructed to the status of having sent proxy update add message to original proxy node. The constructing unit 904 is also used for constructing a proxy update add message according to notification of the identifier determination unit, and setting distribution identifier in the proxy update add message constructed to the status of having sent proxy update add message to original proxy node. Setting of distribution identifier could be completed by the modifying unit 9042.

In other embodiments, the device for notifying proxy update also includes: a proxy table unit 906, configured to save the local proxy information table, and update the local proxy information table according to the proxy update add message received by the receiving unit 901, or provide an interface for the searching unit 903 to search the proxy information table. Searching of the proxy information table by the searching unit 903 may be as follows: The searching unit 903 reads the proxy information table, index for the proxy information table according to the terminal address, and acquires proxy information corresponding to the terminal address.

In other embodiments, the device for notifying proxy update may include both the identifier determination unit 905 and proxy table unit 906 mentioned above.

The device for notifying proxy update in the present embodiment may be set in the MP, which could be the intermediate node MP3 in the WMN provided by embodiment 3.

Embodiment 8

The embodiment of the present invention provides another method for notifying proxy update in the WMN. The difference between the method of the present embodiment and method provided in embodiment 4 is as follows:

After receiving the proxy update add message, the node firstly judges whether proxy information of terminal STA1 in the proxy update add message is carried in its own local proxy information table; if not, the local proxy information table is updated directly by adding proxy information of terminal STA1 in the local proxy information table which is the address of MAP2; if proxy information of terminal STA1 is carried in the local proxy information table of node itself, a judgment is further made about whether proxy information which already exists in the local proxy information table of node itself is consistent with the address of the current proxy node MAP2 of terminal STA1 in the proxy update add message or not; if they are consistent, the received proxy update add message is forwarded to next hop or the received proxy update add message is discarded; if they are inconsistent, the proxy information in the local proxy information table of terminal STA1, namely, address of original proxy node MAP1 of terminal STA1, is acquired, and a new proxy update add message is constructed according to MAP1, and update the local proxy information table and send the new proxy update add message constructed to MAP1 after constructing the new proxy update add message based on that MAP1 serves as destination node address.

Furthermore, in embodiments mentioned above, nodes that receive the proxy update add message judge, before forwarding the message, whether the nodes themselves are destination nodes or not: if nodes that receive the proxy update add message are destination nodes, the nodes do not forward the proxy update add message; otherwise, the message is forwarded; or, after receiving the proxy update add message, the node makes a judgment about whether the node it self is the destination node or not: if the node itself is not the destination node, the proceeding process is followed; if the node itself is the destination node, the local proxy information table is updated directly and it is unnecessary to forward or construct the new proxy update add message.

In conclusion, above embodiments are some exemplary embodiments of the present invention but not intended to limit the present invention. Any modification, equivalent replacement, improvement within the spirit and principle of the present invention should be regard as being included in the protection scope of the present invention.

What is claimed is:

1. A method for notifying proxy update in a Wireless Mesh Network (WMN), comprising:

constructing a proxy update add message, wherein the proxy update add message comprises an address of a terminal, an address of a current proxy node after terminal switching, and a destination node address, wherein the destination node address is an address of an original proxy node, which is the proxy node before terminal switching;

sending the proxy update add message to the original proxy node, wherein the proxy update add message is for updating proxy information of the terminal in a proxy information table of the original proxy node to be the address of the current proxy node;

receiving the proxy update add message sent by the current proxy node, and searching a local proxy information table for acquiring the address of the original proxy node of the terminal according to the address of the terminal carried in the proxy update add message; wherein the proxy update add message sent by the current proxy node further comprises a distribution identifier configured to identify whether the proxy update add message is sent to the original proxy node or not; and after receiving the proxy update add message sent by the current proxy node, according to the distribution identifier, the proxy update add message is forwarded to a next hop when the proxy update add message has been sent to the original proxy node; and when the proxy update add message has not been sent to the original proxy node, the proxy update add message is constructed and the distribution identifier is modified to identify that the proxy update add message has been sent to the original proxy node.

2. The method according to claim 1, wherein the constructing of the proxy update add message is:

according to the proxy update add message sent by the current proxy node, constructing a new proxy update add message, wherein the new proxy update add message takes the original proxy node address as the destination node address, and comprises the address of the terminal carried in the proxy update add message sent by the current proxy node and the address of the current proxy node, which is the proxy node after terminal switching.

3. The method according to claim 1, wherein the acquiring of the address of the original proxy node, comprises:

receiving a request message sent by the terminal or the original proxy node, wherein the request message carries the address of the original proxy node of the terminal; and acquiring the address of the original proxy node of the terminal from the request message.

4. The method according to claim 3, wherein constructing a proxy update add message comprises:

according to the address of the original proxy node, constructing a new proxy update add message, wherein the new proxy update add message takes the address of the original proxy node as the destination node address, and comprises the address of the current proxy node, which is the proxy node after the terminal switching, and the address of the terminal.

5. The method according to 1, wherein: after the step of acquiring the address of the original proxy node, the method further comprises:

updating the proxy information of the terminal to be the address of the current proxy node in the local proxy information table.

6. The method according to claim 1, wherein the proxy update add message carries the destination node address by:

increasing a destination node address field in a proxy update information element (Proxy Update IE) for carrying the destination node address; or reusing a Basic Service Set Identification (BSSID) field of a media access control (MAC) head for carrying the destination node address.

7. A Wireless Mesh Network (WMN) node for notifying proxy update in a WMN, comprising:

a constructing unit configured to construct a proxy update add message, wherein the proxy update add message takes a address of an original proxy node of a terminal as a destination node address, and includes an address of the terminal and an address of a current proxy node of the terminal;

a sending unit configured to send the proxy update add message to a destination node according to the destination node address acquired by the constructing unit, wherein the proxy update add message is configured for updating proxy information of the terminal in a proxy information table of the destination node to be the address of the current proxy node of the terminal;

a receiving unit configured to receive the proxy update add message sent by the current proxy node, which is the proxy node after terminal switching, wherein the proxy update add message comprises the address of the terminal and the address of the current proxy node of the terminal;

a searching unit configured to search a local proxy information table to acquire, according to the address of the terminal carried in the proxy update add message received by the receiving unit, the address of the original proxy node, which is the proxy node before terminal switching; and an identifier judging unit configured to judge a distribution identifier carried in the proxy update add message received by the receiving unit, wherein the distribution identifier is configured to identify whether the proxy update add message has been sent to the original proxy node or not, and the constructing unit is further configured to construct the proxy update add message when a judging result of the identifier judging unit is that the proxy update add message has not been sent to the original proxy node, and modify the distribution identifier in the proxy update add message to identify that the proxy update add message has been sent to the original proxy node.

8. The WMN node according to claim 7, wherein the constructing unit comprises:

a copying unit configured to copy the proxy update add message received by the receiving unit; and a modifying unit configured to set the destination node address of the proxy update add message copied by the copying unit to the address of the original proxy node address acquired by the searching unit.

9. The WMN node according to claim 7, wherein the WMN node further comprises:

a receiving unit configured to receive a request message sent by the terminal or the original proxy node, which is the proxy node before terminal switching, wherein the request message carries the address of the original proxy node, which is the address of the proxy node before terminal switching; and a resolution unit configured to acquire the address of the original proxy node address of the terminal from the request message received by the receiving unit.

10. The WMN node according to any one of claims 7, wherein the WMN node further comprises:

a proxy table unit configured to save the local proxy information table, and update the local proxy information table according to the message received by the receiving unit.

* * * * *